United States Patent
Nakatani et al.

(10) Patent No.: US 12,528,969 B2
(45) Date of Patent: Jan. 20, 2026

(54) FILM FORMING METHOD, POLYPHENYLENE SULFIDE POWDER COATING MATERIAL, COATING FILM, AND COATED ARTICLE

(71) Applicant: DAIKIN INDUSTRIES, LTD., Osaka (JP)

(72) Inventors: Yasukazu Nakatani, Osaka (JP); Shichou Chin, Osaka (JP); Toshio Miyatani, Osaka (JP); Hirotake Imada, Osaka (JP); Yukari Honda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 191 days.

(21) Appl. No.: 17/789,391

(22) PCT Filed: Dec. 18, 2020

(86) PCT No.: PCT/JP2020/047380
§ 371 (c)(1),
(2) Date: Jun. 27, 2022

(87) PCT Pub. No.: WO2021/132064
PCT Pub. Date: Jul. 1, 2021

(65) Prior Publication Data
US 2023/0051217 A1    Feb. 16, 2023

(30) Foreign Application Priority Data

Dec. 27, 2019 (JP) ................. 2019-238119

(51) Int. Cl.
*C09D 165/00* (2006.01)
*B05D 7/16* (2006.01)

(52) U.S. Cl.
CPC ............ *C09D 165/00* (2013.01); *B05D 7/16* (2013.01)

(58) Field of Classification Search
CPC ...................... C09D 165/00; Y10T 428/24355
See application file for complete search history.

(56) References Cited

U.S. PATENT DOCUMENTS

| | | | |
|---|---|---|---|
| 3,801,379 A | 4/1974 | Blackwell | |
| 4,396,658 A * | 8/1983 | Mettes | C09D 181/02 428/35.8 |
| 5,178,958 A | 1/1993 | Inai et al. | |
| 2011/0027582 A1* | 2/2011 | Mikame | C09D 5/036 524/514 |
| 2015/0030857 A1* | 1/2015 | Shigenai | C08J 3/12 524/514 |

FOREIGN PATENT DOCUMENTS

| | | |
|---|---|---|
| EP | 0367884 A1 | 5/1990 |
| EP | 2634206 A1 | 9/2013 |
| JP | 58-152061 A | 9/1983 |
| JP | 04-33971 A | 2/1992 |
| JP | 08-60097 A | 3/1996 |
| JP | 2004-211030 A | 7/2004 |
| JP | 2011-174033 A | 9/2011 |
| WO | 2020/011990 A1 | 1/2020 |

OTHER PUBLICATIONS

[NPL-1] "Ryton® PPS FAQ"; Syensqo, May 30, 2024; <https://www.syensqo.com/en/brands/ryton-pps/faq>. (Year: 2024).*
[NPL-2] "Overview of materials for Polyphenylene Sulfide (PPS), Unreinforced, Extruded"; MatWeb, May 30, 2024; <https://www.matweb.com/search/datasheet.aspx?MatGUID=f277b224f135406caa973d38d49104ca>. (Year: 2024).*
[NPL-3] "Overview of materials for Polyphenylene Sulfide (PPS), Molded"; MatWeb, May 30, 2024; <https://www.matweb.com/search/datasheet.aspx?MatGUID=85f82c69a02a44f0a5bba4fbe8e38fd7>. (Year: 2024).*
"Features of Susteel PPS", PPS (Susteel(R)), Tosoh Corporation, March, 8, 2021, https://www.tosoh.co.jp/product/petrochemicals/polymer/pps.html.
Japanese Office Action for Corresponding JP 2020-209784, dated Apr. 13, 2021.
Japanese Office Action for Corresponding JP 2020-209784, dated Aug. 31, 2021.
International Search Report for PCT/JP2020/047380, dated Mar. 16, 2021.
International Preliminary Report on Patentability dated Jun. 28, 2022 with a Translation of the Written Opinion of the International Searching Authority in Application No. PCT/JP2020/047380.
"Processing Technology of Chemical Fibers", Donghua University Press, Textile and garment higher education "Thirteen Five" ministry-level planning textbook, Jan. 2018, pp. 225-226 (12 pages total).
Office Action dated Nov. 9, 2022 from the Chinese Patent Office in counterpart Application No. 202080089945.9.

* cited by examiner

Primary Examiner — Donald M Flores, Jr.
(74) Attorney, Agent, or Firm — Sughrue Mion, PLLC

(57) ABSTRACT

Provided is a film forming method that can form a film having a thickness of 500 μm or more with a single coating of a substrate.
The present disclosure is a film forming method using a powder coating material containing a polyphenylene sulfide resin, the method including heating the powder coating material at a temperature equal to or higher than a melting point of the polyphenylene sulfide resin and within a range of 250 to 400° C., in which a single coating of a substrate forms a film having a thickness of 500 μm or more; and the obtained film has a surface roughness, Ra, of 0.30 μm or less.

14 Claims, No Drawings

FILM FORMING METHOD, POLYPHENYLENE SULFIDE POWDER COATING MATERIAL, COATING FILM, AND COATED ARTICLE

CROSS REFERENCE TO RELATED APPLICATIONS

This application is a National Stage of International Application No. PCT/JP2020/047380 filed Dec. 18, 2020, claiming priority based on Japanese Patent Application No. 2019-238119 filed Dec. 27, 2019.

TECHNICAL FIELD

The present disclosure relates to a film forming method, a polyphenylene sulfide powder coating material, a coating film, and a coated article.

BACKGROUND ART

Polyphenylene sulfide powder coating materials are disclosed in Patent Literatures 1 to 3.

Patent Literature 1 discloses a method of forming a film having a thickness of 60 to 80 µm using a polyphenylene sulfide powder coating material.

Patent Literature 2 discloses a method of forming a film having a thickness of 60 to 80 µm using a polyphenylene sulfide powder coating material.

Patent Literature 3 discloses a method of forming a film having a thickness of 200 µm using a polyphenylene sulfide powder coating material.

On members of heat exchangers and excavating members for natural gas, it is required to form a smooth thick film having a high hardness and excellent heat resistance and chemical resistance.

CITATION LIST

Patent Literature

Patent Literature 1: Japanese Patent Laid-Open No. 2011-174033
Patent Literature 2: Japanese Patent Laid-Open No. 8-60097
Patent Literature 3: Japanese Patent Laid-Open No. 4-33971

SUMMARY OF INVENTION

Technical Problem

An object of the present disclosure is to provide a film forming method that can form a film having a thickness of 500 µm or more by a single coating of a substrate.

Solution to Problem

The present disclosure is a film forming method using a powder coating material containing a polyphenylene sulfide resin, the method including heating the powder coating material at a temperature equal to or higher than a melting point of the polyphenylene sulfide resin and within a range of 250 to 400° C., in which: a single coating of a substrate forms a film having a thickness of 500 µm or more; and the obtained film has a surface roughness, Ra, of 0.30 µm or less.

The polyphenylene sulfide resin preferably has an MFR of 10 to 100 g/10 min.

The powder coating material preferably has an average particle size of 20 to 500 µm.

The powder coating material preferably contains no inorganic filler.

The present disclosure is also a polyphenylene sulfide powder coating material being able to form a film having a thickness of 500 µm or more and a surface roughness, Ra, of 0.30 µm or less by a single coating of a substrate under a condition of heating at a temperature within a range of 250 to 400° C. and equal to or higher than a melting point of a polyphenylene sulfide resin.

The polyphenylene sulfide resin preferably has a melting point within a range of 260° C. to 300° C., and the obtained film preferably has a Shore hardness of D90 or more.

The present disclosure is also a polyphenylene sulfide powder coating material containing a polyphenylene sulfide resin having an MFR of 10 to 100 g/10 min, in which an average particle size of the powder is within a range of 20 to 500 µm.

The polyphenylene sulfide powder coating material preferably contains no inorganic filler.

The present disclosure is also a coating film formed by any of the above film forming methods.

The present disclosure is also a coated article including: a substrate; and the coating film formed on the substrate.

In the coated article, the substrate is preferably a metal.

Advantageous Effect of Invention

The film forming method of the present disclosure can form a smooth film having a thickness of 500 µm or more, a high hardness, and excellent heat resistance and chemical resistance by a single coating of a substrate, without a problem of cracking on the coating film.

DESCRIPTION OF EMBODIMENTS

The present disclosure will be described in detail below.

The present disclosure relates to a coating method with a polyphenylene sulfide powder coating material and to a polyphenylene sulfide powder coating material. The present disclosure can form a smooth thick film being able to be used for members of heat exchangers and excavating members for natural gas and having a high hardness and excellent heat resistance and chemical resistance.

The polyphenylene sulfide powder coating materials, which are technically known as above, have been hardly used in practical application. This is due to such a problem that cracking is likely to occur during a formation of the film with thermal curing after the coating. The cracking is presumed to be caused by heat shrinkage of the polyphenylene sulfide resin. Thus, the polyphenylene sulfide resins are mainly used in the fields of injection molding and the like.

On the other hand, it has been attempted to use excellent functions, such as heat resistance, barrier property, and chemical resistance, of the polyphenylene sulfide resins. It would be preferable that polyphenylene sulfide resins can be used in the fields of coating requiring excellent heat resistance, chemical resistance, high hardness, and the like, such as, for example, members of heat exchangers, excavating members for crude oil or natural gas, agricultural machines, hot water piping, and adhesion preventing members against marine organisms.

To obtain the required properties in these applications, a thick film is needed to be formed. In particular, if a coating film layer of 500 μm or more can be formed by a single coating, each of the above properties can be achieved at high levels.

Such formation of a thick film with a single step is, however, likely to cause cracking on the coating film. Thus, methods such as repeated formations of thin films are required. In addition, the film is required to have a small surface roughness, and formation of a thick film requires smoothing by sufficiently melting the resin. Thus, it has not been attempted to achieve these purposes using powder coating materials containing a conventionally known, common polyphenylene sulfide resin.

The film forming method of the present disclosure is a film forming method using a powder coating material containing a polyphenylene sulfide resin, the method including heating the powder coating material at a temperature equal to or higher than a melting point of the polyphenylene sulfide resin and within a range of 250 to 400° C., in which a single coating of a substrate forms a film having a thickness of 500 μm or more, and the obtained film has a surface roughness, Ra, of 0.30 μm or less.

The film forming method of the present disclosure includes heating the powder coating material at a temperature equal to or higher than a melting point of the polyphenylene sulfide resin and within a range of 250 to 400° C. The melting point of the polyphenylene sulfide resin is a value measured with an endothermic peak of differential scanning calorimeter (DSC) analysis. This endothermic peak is a value obtained by heating at a rate of 10° C./min at a first run.

The heating at a temperature within the above range can form a good film with no cracking. A lower limit of the heating temperature is more preferably 260° C., and still more preferably 270° C. The upper limit of the heating temperature is preferably 390° C., and still more preferably 380° C.

In the heating step, heating at a temperature equal to or lower than the melting point of the polyphenylene sulfide resin is unpreferable because the resin does not melt and a good coating film is not formed.

Coating with a powder coating material is typically performed by a method in which the powder coating material is adhered onto a material to be coated with a method such as electrostatic coating, and then heated to melt a resin in the powder coating material to form a film. To melt the resin in the powder coating material, the present disclosure performs heating at a temperature within the above range. The heating at a temperature within the above range is preferable because a film having a smooth surface can be obtained.

The electrostatic coating in the film forming method of the present disclosure is not limited, and common methods can be used. To obtain a thick film of 500 μm or more, the electrostatic coating is preferably performed after a metal substrate is preheated. A preheating temperature of the metal substrate can be set within a range of 250 to 400° C. Since the electrostatic coating step is generally performed at a room temperature, the coating step is preferably completed before the temperature of the preheated metal substrate decreases to the room temperature. The temperature of the metal substrate during the coating is preferably within a range of 50 to 400° C. The temperature of the metal substrate during the coating is more preferably 100 to 300° C.

Since lines of electric force concentrate at a protruding portion on the substrate, electrostatic coating is likely to cause such a problem that the powder coating material gathers at the protruding portion and the portion other than the protruding portion is not coated. On the other hand, using the film forming method of the present disclosure, a thick film can be formed, and thereby the portion other than the protruding portion can also be coated.

The film obtained by the film forming method of the present disclosure preferably has a Shore hardness of D90 or more. The Shore hardness is a value measured with a measuring method described in ASTM D 224.

The Shore hardness of D90 or more is preferable because the film will have a high hardness. The Shore hardness is more preferably 95 or more, and still more preferably 100 or more.

The film obtained by the film forming method of the present disclosure preferably has a surface roughness of 0.30 μm or less. The surface roughness is more preferably 0.20 μm or less. In the present disclosure, the surface roughness means a value measured with a method described in Examples.

The present disclosure is also a polyphenylene sulfide powder coating material being able to form a film having a thickness of 500 μm or more and a surface roughness, Ra, of 0.30 μm or less by a single coating under a condition of heating at a temperature within a range of 250 to 400° C. and equal to or higher than a melting point of a polyphenylene sulfide resin.

The powder coating material used in the film forming method of the present disclosure contains a polyphenylene sulfide resin. The polyphenylene sulfide resin is not limited, and may be a linear one or a crosslinked one.

The polyphenylene sulfide resin having a melt flow rate (MFR) of 10 to 100 g/10 min is preferably used. The MFR, which is a parameter known as an index of resin flowability, is a value meaning an amount of a resin that is added in a cylindrical extrusion plastometer and heated and pressured at a predetermined temperature to be extruded within a predetermined time through the opening of the container bottom.

The MFR is a value measured with a measuring method described in ASTM D1238-86 (315.5° C., a load of 5,000 g).

An MFR of less than 10 g/10 min is likely to cause an insufficient coatability and an insufficient smoothness on the film. An MFR of more than 100 g/10 min is likely to cause insufficient smoothness on the film surface, and in addition, to cause cracking on the film surface.

A polyphenylene sulfide resin having the above MFR has not been used in known powder coating materials; thus, it is presumed that such films are difficult to be thickened. The polyphenylene sulfide resin having the predetermined MFR can be obtained by, typically, regulating the molecular weight into a polymer region.

A lower limit of the MFR is more preferably 15 g/10 min, and still more preferably 20 g/10 min. An upper limit of the MFR is more preferably 95 g/10 min, and still more preferably 90 g/10 min. A particularly preferable range of the MFR is 30 to 80 g/10 min.

The powder coating material of the present disclosure may be composed of only a powder of the polyphenylene sulfide resin, or may additionally contain another component if necessary. Examples of the other component include inorganic fillers and engineering plastics such as a fluororesin. A content of the polyphenylene sulfide resin is preferably 30 weight % or more, more preferably 50 weight % or more, and still more preferably 70 weight % or more, based on a total amount of the powder coating material.

The polyphenylene sulfide resin preferably has a melting point of 270° C. or higher. Using a polyphenylene sulfide resin having a high melting point can appropriately achieve the above purpose.

The polyphenylene sulfide resin having the above property is not limited, and may be commercially available ones.

The inorganic filler is not limited, and examples thereof include staple fibers such as glass fiber and carbon fiber. The inorganic filler may be contained at a proportion of 30 weight % or less based on a total amount of the powder coating material.

The present disclosure needs to form a film having a low surface roughness. Since containing the inorganic filler is likely to increase the surface roughness, it is still preferable that the amount of the inorganic filler contained be 20 weight % or less, or no inorganic filler be contained in the case that a particularly low surface roughness is needed.

Adding the fluororesin in the powder coating material of the present disclosure may improve chemical resistance or the like of the film. Thus, the fluororesin is preferably added when the film is used for applications requiring, for example, chemical resistance.

The fluororesin is not limited, and preferably a thermoplastic fluororesin. Specific examples thereof include powder of at least one fluorine-containing polymer selected from the group consisting of a copolymer (FEP) of tetrafluoroethylene (TFE)/hexafluoropropylene (HFP), a copolymer (PFA) of tetrafluoroethylene (TFE)/perfluoro(alkyl vinyl ether) (PAVE), and a copolymer (ETFE) of ethylene/tetrafluoroethylene (TFE).

The FEP is not limited, and preferably a copolymer having a mole ratio of a TFE unit and an HFP unit (TFE unit/HFP unit) of 70 to 99/30 to 1. The mole ratio is more preferably 80 to 97/20 to 3. Too little TFE unit tends to deteriorate mechanical properties, and too much TFE unit tends to cause an excessively high melting point to deteriorate moldability. The FEP is also preferably a copolymer in which an amount of a monomer unit derived from a monomer copolymerizable with TFE and HFP is 0.1 to 10 mol % and a total amount of the TFE unit and the HFP unit is 90 to 99.9 mol %. Examples of the monomer copolymerizable with TFE and HFP include PAVE and an alkyl perfluorovinyl ether derivative.

The PFA is not limited, and preferably a copolymer having a mole ratio of a TFE unit and a PAVE unit (TFE unit/PAVE unit) of 70 to 99/30 to 1. The mole ratio is more preferably 80 to 98.5/20 to 1.5. Too little TFE unit tends to deteriorate mechanical properties, and too much TFE unit tends to cause an excessively high melting point to deteriorate moldability. The PFA is also preferably a copolymer in which an amount of a monomer unit derived from a monomer copolymerizable with TFE and PAVE is 0.1 to 10 mol % and a total amount of the TFE unit and the PAVE unit is 90 to 99.9 mol %. Examples of the monomer copolymerizable with TFE and PAVE include: HFP; a vinyl monomer represented by $CZ^3Z^4\!\!=\!\!CZ^5(CF_2)_nZ^6$ wherein $Z^3$, $Z^4$, and $Z^5$, which are same or different, represent a hydrogen atom or a fluorine atom, $Z^6$ represents a hydrogen atom, a fluorine atom, or a chlorine atom, and n represents an integer of 2 to 10; and alkyl perfluorovinyl ether derivatives represented by $CF_2\!\!=\!\!CF\!\!-\!\!OCH_2\!\!-\!\!Rf^7$ wherein $Rf^7$ represents a perfluoroalkyl group having 1 to 5 carbon atoms.

The ETFE is not limited, and may be, for example, the following ones.

The ETFE is preferably a copolymer having a mole ratio of a TFE unit and an ethylene unit in the ETFE resin (TFE unit/ethylene unit) of 20/80 or more and 90/10 or less. The mole ratio is more preferably 37/63 or more and 85/15 or less, and still more preferably 38/62 or more and 80/20 or less.

The ETFE may be, for example, a copolymer composed of TFE, ethylene, and a monomer copolymerizable with TFE and ethylene.

Examples of the monomer copolymerizable with TFE and ethylene include monomers represented by the following formulas,

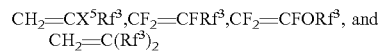

wherein $X^5$ represents a hydrogen atom or a fluorine atom, and $Rf^3$ represents a fluoroalkyl group optionally containing an ether bond. Among them, fluorine-containing vinyl monomers represented by $CF_2\!\!=\!\!CFRf^3$, $CF_2\!\!=\!\!CFORf^3$, and $CH_2\!\!=\!\!CX^5Rf^3$ are preferable, and HFP, a perfluoro(alkyl vinyl ether) represented by $CF_2\!\!=\!\!CF\!\!-\!\!ORf^4$ wherein $Rf^4$ represents a perfluoroalkyl group having 1 to 5 carbon atoms, and a fluorine-containing vinyl monomer represented by $CH_2\!\!=\!\!CX^5Rf^3$ wherein $Rf^3$ represents a fluoroalkyl group having 1 to 8 carbon atoms are more preferable. The monomer copolymerizable with TFE and ethylene may also be, for example, aliphatic unsaturated carboxylic acids such as itaconic acid and itaconic anhydride. An amount of the monomer copolymerizable with TFE and ethylene is preferably 0.1 to 10 mol %, more preferably 0.1 to 5 mol %, and particularly preferably 0.2 to 4 mol %, based on the fluorine-containing polymer.

The melting point of the ETFE is preferably 140 to 340° C., more preferably 160 to 300° C., and still more preferably 195 to 275° C.

The MFR of the ETFE is preferably 1 to 100 g/10 min, more preferably 2 to 50 g/10 min, and still more preferably 4 to 40 g/10 min.

The specific gravity of the ETFE is preferably 1.70 to 1.90.

The fluororesin is preferably contained at a proportion of 30 weight % or less based on a total amount of the powder coating material. Containing the fluororesin at a proportion of more than 30 weight % may cause a problem of decrease in the film hardness. The upper limit is more preferably 29 weight %.

Adding an engineering plastic other than the fluororesin in the powder coating material of the present disclosure may improve, for example, an adhesiveness to the metal substrate. Thus, the engineering plastic other than the fluororesin is preferably added when the film is used for applications requiring, for example, a strong adhesiveness.

Examples of the engineering plastic other than the fluororesin include a polysulfone, a polyamideimide, a polyetherimide, a polyimide, a polyaryletherketone, and a polyethersulfone. These engineering plastics other than the fluororesin is preferably contained at a proportion of 30 weight % or less based on a total amount of the powder coating material. Containing the engineering plastic other than the fluororesin at a proportion of more than 30 weight % may cause a problem of decrease in the film hardness. The upper limit is more preferably 29 weight %.

When additives such as the inorganic filler and the engineering plastic such as the fluororesin are used in combination, the powder coating material may be mixed in a powder state, or may be manufactured by integrating a composition by melt-kneading or the like and then crushed to be a powder in which a plurality of components is mixed.

The powder coating material of the present disclosure preferably has an average particle size of 20 to 500 μm. An average particle size outside the above range is unpreferable because a good thick film may not be formed. The upper limit is more preferably 480 μm, and still more preferably 450 μm. The lower limit is more preferably 22 μm, and still more preferably 25 μm.

The average particle size of the powder coating material is a value measured with a method described in JIS K 5600. When the powder coating material is composed of only the polyphenylene sulfide resin, only an average particle size of the polyphenylene sulfide resin is measured. When the inorganic filler or the fluoropolymer is additionally contained, the average particle size means an average particle size obtained by measuring a whole composition including these components.

The above polyphenylene sulfide powder coating material is also one of the present disclosures. In addition, the film obtained by the film forming method of the present disclosure is also one of the present disclosures.

A manufacturing method of the polyphenylene sulfide powder coating material is not limited, and the powder coating material can be obtained by common methods. The polyphenylene sulfide powder coating material can be obtained by crushing the polyphenylene sulfide resin or a composition of the polyphenylene sulfide resin and other resins. The crushed powder coating material may be sieved, if necessary, to regulate the particle size. A method of regulating the average particle size within the above range is not limited, and may be, for example, setting the crushing conditions and removing fine particles and coarse particles by sieving.

The present disclosure is also a coating film formed with the above film forming method. Such a coating film advantageously has a high hardness.

The present disclosure is also a coated article including: a substrate; and the coating film formed on the substrate. A shape of such a coated article is not limited, and may be, for example, film-shaped, sheet-shaped, tubular, and in addition, three-dimensional shape such as a molded article.

In the laminate, a material of the substrate is not limited, and still preferably a metal. Coating the metal advantageously has a high coating efficiency. The metal is not limited, and examples thereof include a steel plate, stainless steel, and aluminum. The powder coating material of the present disclosure exhibits particularly excellent coating ability on these materials.

EXAMPLES

The present disclosure will be specifically described below based on Examples. In the following Examples, unless otherwise mentioned, "part" and "%" refer to "part by weight" and "weight %," respectively.

Average Particle Size

Average particle sizes were measured by using Microtrac Particle Size Analyzer MT 3300 EXII, manufactured by Nikkiso Co., Ltd.

Thickness, Surface Roughness, and Hardness of Coating Film

A metal substrate that had been calmly placed in an electric furnace at 350° C. for 30 minutes was taken under ordinary temperature. An SS40 steel plate was coated with polyphenylene sulfide powder in a state where a temperature of the metal substrate was 200° C. or higher by using Powder Electrostatic Coating Equipment EP-MC 10, manufactured by ANEST IWATA Corporation, at an applied voltage of 40 kV, and the coated plate was then heated at 350° C. for 30 minutes to obtain a coating film. A thickness was measured at five points per coating film by using Electro-Magnetic Coating Thickness Meter SWT-8100, manufactured by Sanko Electronic Laboratory Co., Ltd. A hardness of the coating film was measured by using Durometer Type D, manufactured by Kobunshi Keiki Co., Ltd., and a surface roughness, Ra, of the coating film was measured by using Surface Roughness Measuring System SJ-210, manufactured by Mitutoyo Corporation.

Furthermore, the obtained coating film was preserved at a room temperature for one week to observe and evaluate occasion of cracking on the coating film during the preservation.

Example 1

A crosslinked polyphenylene sulfide powder having an MFR of 85 (g/10 min) and a melting point of 277° C. was crushed by using a crusher NEA Mill, manufactured by Dalton Corporation, to obtain a crushed polyphenylene sulfide having an average particle size of 75 μm. A coating film was produced with this crushed polyphenylene sulfide.

Examples 2 to 5 and Comparative Examples 1 to 6

A procedure similar to the procedure in Example 1 was repeated except that linear or crosslinked polyphenylene sulfide powders having an MFR and a melting point described in the attached sheet were used.

Example 6

To the crushed polyphenylene sulfide obtained in Example 3, glass fiber (manufactured by Nitto Boseki Co., Ltd., filament diameter of 13 μm) was added at a proportion of 30 wt %/amount of the polyphenylene sulfide to mix uniformly. A coating film was produced with this mixture.

The properties of powders and coating films obtained above are described in Table 1.

TABLE 1

| | | MFR (g/10 min) | Melting point (° C.) | Average particle size (μm) | Amount (wt %/PPS) of glass fiber added (wt %/PPS) | Film thickness (μm) | Coating film hardness | Surface roughness Ra (μm) | Cracking on coating film |
|---|---|---|---|---|---|---|---|---|---|
| Example 1 | Crosslinked | 85 | 277 | 75 | — | 700-800 | D90-95 | 0.16 | No cracking occurred one week after coating |
| Example 2 | Linear | 14 | 286 | 123 | — | 700-800 | D90-95 | 0.18 | No cracking occurred one week after coating |
| Example 3 | Linear | 37 | 284 | 29 | — | 700-800 | D90-95 | 0.12 | No cracking occurred one week after coating |
| Example 4 | Linear | 61 | 285 | 56 | — | 700-800 | D90-95 | 0.11 | No cracking occurred one week after coating |

TABLE 1-continued

|  | | MFR (g/10 min) | Melting point (° C.) | Average particle size (μm) | Amount (wt %/PPS) of glass fiber added (wt %/PPS) | Film thickness (μm) | Coating film hardness | Surface roughness Ra (μm) | Cracking on coating film |
|---|---|---|---|---|---|---|---|---|---|
| Example 5 | Linear | 81 | 285 | 321 | — | 700-800 | D90-95 | 0.15 | No cracking occurred one week after coating |
| Example 6 | Linear | 37 | 284 | 29 | 30 | 700-800 | D95-100 | 0.18 | No cracking occurred one week after coating |
| Comparative Example 1 | Crosslinked | 2000 | 277 | 81 | — | 600-700 | D90-95 | 0.34 | Cracking occurred three days after coating |
| Comparative Example 2 | Linear | 7 | 286 | 72 | — | 700-800 | D90-95 | 0.35 | No cracking occurred one week after coating |
| Comparative Example 3 | Linear | 102 | 284 | 53 | — | 700-800 | D90-95 | 0.31 | No cracking occurred one week after coating |
| Comparative Example 4 | Linear | 1050 | 285 | 70 | — | 600-700 | D90-95 | 0.34 | Cracking occurred one day after coating |
| Comparative Example 5 | Linear | 1800 | 285 | 142 | — | 600-700 | D90-95 | 0.42 | Cracking occurred one day after coating |
| Comparative Example 6 | Linear | 61 | 285 | 520 | — | 500-600 | D90-95 | 0.31 | No cracking occurred one week after coating |

From the results in Table 1, it is obvious that the film forming method of the present disclosure forms a thick film of 500 μm or more having a low surface roughness and an excellent surface smoothness without cracking.

From the above results, the film forming method of the present disclosure obviously has the excellent effects. On the other hand, some applications may additionally require effects such as an improvement in chemical resistance or peel strength of the film in addition to the above effects.

A case where a resin other than the polyphenylene sulfide resin is used in combination to obtain these additional effects will be described below with Examples.

Example 7

The polyphenylene sulfide coating film obtained in Example 3 was immersed in hot water to be peeled from the metal substrate, and then the peeled coating film was immersed in 30% aqueous nitric acid at 80° C. for one week to evaluate a change in weight.

Example 8

To the crushed polyphenylene sulfide obtained in Example 3, an FEP powder (average particle size of 15 μm, MFR of 21 g/10 min) was added at a proportion of 30 wt %/amount of the polyphenylene sulfide to mix uniformly, and a coating film was produced with this mixture. This coating film was immersed in hot water to be peeled from the metal substrate, and the peeled coating film was immersed in 30% aqueous nitric acid at 80° C. for one week to evaluate a change in weight.

Example 9 (Detail of Pull-Off Test)

A peel strength of the polyphenylene sulfide coating film obtained in Example 3 with the SS40 steel plate was evaluated with the pull-off method described in JIS K 5600-5-7.

Example 10

To the crushed polyphenylene sulfide obtained in Example 3, a polyamideimide (average particle size of 20 μm, acid value of 80 mgKOH/g) was added at a proportion of 30 wt %/amount of the polyphenylene sulfide to mix uniformly, and a coating film was produced with this mixture. A peel strength of this coating film with the SS40 steel plate was evaluated with the pull-off method described in JIS K 5600-5-7.

Example 11

To the crushed polyphenylene sulfide obtained in Example 3, a polyethersufone powder (average particle size of 20 μm, reduced viscosity of 0.50) was added at a proportion of 30 wt %/amount of the polyphenylene sulfide to mix uniformly, and a coating film was produced with this mixture. A coating film was produced with this mixture. A peel strength of this coating film with the SS40 steel plate was evaluated with the pull-off method described in JIS K 5600-5-7.

The above obtained evaluation results of the changes in weight are described in Table 2, and the above obtained evaluation results of the peel strengths are described in Table 3.

TABLE 2

|  |  | MFR (g/10 min) | Melting point (° C.) | Average particle size (μm) | Engineering plastic added | Amount (wt %/PPS) added | Change in weight (%) after immersion in 30% nitric acid (%) |
|---|---|---|---|---|---|---|---|
| Example 7 | Linear | 37 | 284 | 29 | — | — | +36 |
| Example 8 | Linear | 37 | 284 | 29 | FEP | 30 | +14 |

TABLE 3

|  |  | MFR (g/10 min) | Melting point (° C.) | Average particle size (μm) | Engineering plastic added | Amount (wt %/PPS) added | Peeling strength (MPa) from iron substrate |
|---|---|---|---|---|---|---|---|
| Example 9 | Linear | 37 | 284 | 29 | — | — | 3.3 |
| Example 10 | Linear | 37 | 284 | 29 | Polyamideimide | 30 | 5.5 |
| Example 11 | Linear | 37 | 284 | 29 | Polyethersulfone | 30 | 4.5 |

From the results in Table 2, it is found that adding the fluororesin improves chemical resistance. From the results in Table 3, it is found that adding the polyamideimide or polyethersulfone improves adhesiveness to the SS40 steel plate.

Therefore, it is obvious that these resins can be used in combination with the polyphenylene sulfide resin particularly when the coating film is used for applications requiring these properties.

INDUSTRIAL APPLICABILITY

The film forming method of the present disclosure can be preferably used for members of heat exchangers, excavating members for crude oil or natural gas, agricultural machines, hot water piping, and adhesion preventing members against marine organisms.

The invention claimed is:

1. A polyphenylene sulfide powder coating material being able to form a film having a thickness of 500 μm or more and a surface roughness, Ra, of 0.30 μm or less by a single coating of a metal substrate under a condition of heating at a temperature within a range of 250 to 400° C. and equal to or higher than a melting point of a polyphenylene sulfide resin, wherein
the polyphenylene sulfide powder coating material has an average particle size of 20 to 500 μm, and
the polyphenylene sulfide powder coating material contains a powder of the polyphenylene sulfide resin, and further contains a fluororesin, a polyamideimide, or a polyethersulfone.

2. The polyphenylene sulfide powder coating material according to claim 1, wherein the melting point is within a range of 260° C. to 300° C.; and the obtained film has a Shore hardness of D90 or more.

3. The polyphenylene sulfide powder coating material according to claim 1, containing no inorganic filler.

4. A coating film formed by the polyphenylene sulfide powder coating material according to claim 1,
wherein the coating film is single layer having a thickness of 500 μm or more and a surface roughness, Ra, of 0.30 μm or less.

5. A coated article comprising: a substrate; and the coating film according to claim 4 formed on the substrate.

6. The coated article according to claim 5, wherein the substrate is a metal.

7. The polyphenylene sulfide powder coating material according to claim 1, wherein the polyphenylene sulfide powder coating material has the average particle size of 321 to 500 μm.

8. A film forming method using the polyphenylene sulfide powder coating material according to claim 1, the method comprising
heating the polyphenylene sulfide powder coating material at a temperature equal to or higher than a melting point of the powder of the polyphenylene sulfide resin and within a range of 250 to 400° C.

9. The film forming method according to claim 8, wherein the powder of the polyphenylene sulfide resin has a melt flow rate, MFR, of 10 to 100 g/10 min.

10. The film forming method according to claim 8, wherein the polyphenylene sulfide powder coating material contains no inorganic filler.

11. A polyphenylene sulfide powder coating material, comprising a polyphenylene sulfide resin having an MFR of 10 to 100 g/10 min,
wherein an average particle size of the polyphenylene sulfide powder coating material is within a range of 20 to 500 μm,
the polyphenylene sulfide powder coating material contains a powder of the polyphenylene sulfide resin, and further contains a fluororesin, a polyamideimide, or a polyethersulfone, and
a content of the polyphenylene sulfide resin is 50 weight % or more based on a total weight of the polyphenylene sulfide powder coating material.

12. The polyphenylene sulfide powder coating material according to claim 11, wherein the polyphenylene sulfide powder coating material has the average particle size of 321 to 500 μm.

13. The polyphenylene sulfide powder coating material according to claim 11, wherein the polyphenylene sulfide powder coating material contains a powder of the polyphenylene sulfide resin, and further contains a fluororesin, a polyamideimide, or a polyethersulfone mixed in a powder state, and a content of the polyphenylene sulfide resin is 50 weight % or more based on a total weight of the polyphenylene sulfide powder coating material.

14. The polyphenylene sulfide powder coating material according to claim 11, wherein a content of the polyphenylene sulfide resin is 70 weight % or more based on a total weight of the polyphenylene sulfide powder coating material.

\* \* \* \* \*